Sept. 26, 1967     W. J. K. STÜBBEN     3,343,338
SADDLE-CUSHION ASSEMBLY
Filed Feb. 7, 1966
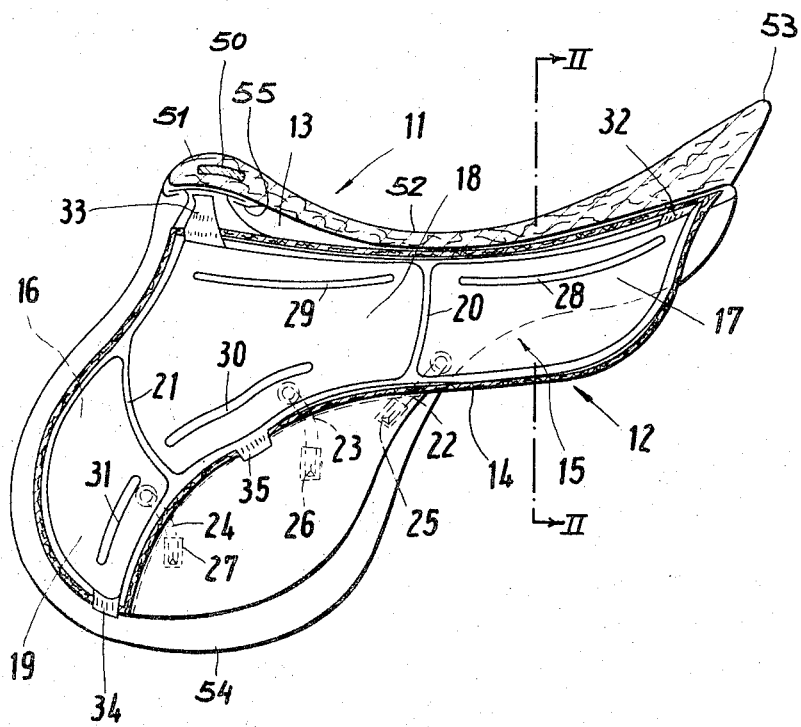
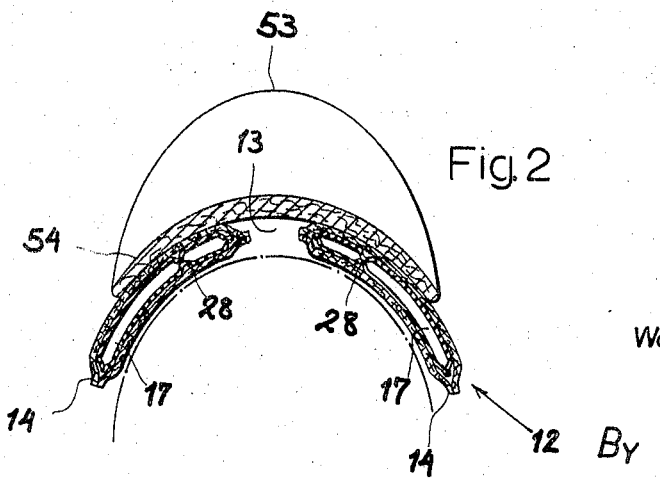
Werner J. K. Stübben
*Inventor.*
By *Ross & Mestern*

United States Patent Office 3,343,338
Patented Sept. 26, 1967

3,343,338
SADDLE-CUSHION ASSEMBLY
Werner Johannes Karl Stübben, Krefeld, Germany, assignor to Joh's Stubben, Krefeld, Germany, a corporation of Germany
Filed Feb. 7, 1966, Ser. No. 526,174
Claims priority, application Austria, Feb. 16, 1965,
A 1,381/65
5 Claims. (Cl. 54—44)

ABSTRACT OF THE DISCLOSURE

Riding saddle whose saddle structure has a pommel, seat, cantle, and a pair of fenders on opposite sides of the saddle structure, and a pair of symmetrical pneumatic cushions underlying the saddle structure, each of said cushions extending the entire length of the saddle and being subdivided by two longitudinally spaced seams into three individually inflatable and separate flat air chambers, including a rear chamber below the cantle, a forward upper chamber below said pommel and a forward lower chamber along the fenders of the saddle structure, the chambers of each cushion being formed unitarily with one another and being provided with respective air tubes for individually filling the chambers, each of the chambers has a further seam lying therewithin for maintaining the flattened state of the cushions.

---

My present invention relates to animal-riding saddles and assemblies thereof with saddle cushions disposed between the saddle shell and the back of the animal to be ridden.

It has been proposed heretofore to provide horse-riding saddles in the form of a shell of leather or other hard-wearing material and to dispose a cushioning material in a hollow of the saddle shell and thus between the latter and the back of the horse. Such arrangements cushioned the pressure of the saddle on the horse's back and distributed it to a greater extent than was possible theretofore both as to the weight of the rider and the rolling movement of the saddle on the back of the horse. Frequently, such saddle cushions were used in place of or in addition to the saddle blanket and thus served the dual function of restricting chafing of the horses back and back preventing shifting of the saddle when it was cinched in place. Such cushions were generally filled with textile fibers and shaped, for the most part, correspondingly to the configuration of the horse's back although the flexibility of the cushion permitted its accommodation to animals of various sizes and their different back shapes. It was, however, found that such cushions were imperfect in the sense that the bunched fibers and the mesh-like character of the surface of the cushion resting against the back of the animal transmitted concentrated stresses thereto at certain locations and failed to contact the back of the animal at others. Thus, certain portions of the fabric formed depressions in the back of the animal and caused undesirable pressures at such locations and such results could not be avoided since the heavy mesh and fiber characteristics of the fabric as well as the relative roughness of the fiber filling were required to resist the wear to which the cushioning layer was exposed. Furthermore, the saddle associated with such filled cushions had to be closely chaped to conform to the back of the animal in order to prevent the application of localized pressures when the rider was in the saddle. Consequently, the saddle could not be used interchangeably for a plurality of horses or, if so used, was not properly suited to at least some of the animals. It will be understood that the disadvantageous pressure characteristics of such saddles, when they were incapable of properly fitting the animals, adversely affected the rider as well with respect to the reaction of the animal to the rider and the altering of its responsiveness.

It is, therefore, an important object of the present invention to provide a saddle assembly for riding horses and the like in which the aforementioned disadvantages can be avoided.

Another object of this invention is to provide a saddle assembly capable of self-adjustment to the backs of different animals without misfitting and which is relatively simple and inexpensive while being capable of cushioning the contact between the rider and the animal.

A further object of this invention is to provide a saddle assembly which can be readily adjustable for different riders as well as for various sizes of animals and which is capable of compensation for the presence of high-pressure areas of the saddle shell. Yet another object of this invention is to provide a saddle-cushion assembly which can be adjusted for individuals and can easily accommodate itself to the optimum force distribution when in place upon the animal.

These objects and others which will become apparent hereinafter, are attained, in accordance with the present invention, by the provision of a saddle-cushion assembly which comprises a saddle shell (e.g. of the English-saddle type) advantageously provided with a pair of fenders, pommel, seat and cantle in the manner conventionally employed with respect to riding saddles; the assembly includes a saddle chamber or hollow between the cantle and the horn at the underside of the shell and which accommodates air-cushion means symmetrically disposed within this chamber along at least the seat regions and fenders beneath the cantle of the saddle on opposite sides of a vertical median plane through the seat, this air-cushion means comprising a plurality of individual air pockets separated from one another by seams ensuring a flat configuration of the air-cushion means. Thus, the present invention provides that a pair of air pillows are disposed symmetrically on opposite sides of this median plane through the saddle structure within the saddle chamber to form a saddle cushion replacing the usual textile-fiber filling of this chamber. Duct means is provided for the inflation of the air pockets of each of the pillows forming the air-cushion means and it has been found that the fluid-filled cushion maintains its flat orientation over prolonged periods by contrast with fiber-filled systems which rapidly become lumpy. Thus, the cushions of the present invention more readily accommodate themselves to the back of an animal while maintaining their more or less flat orientation. By regulation of the pressure within the air pockets or individual compartments of the air-cushion means, the saddle structure can be adjusted to any desired orientation, inclination or position on the back of the animal and, according to an important feature of this invention, a plurality of air pockets are longitudinally placed beneath the saddle shell in each of the pillows while means are provided for individually inflating these air pockets to adjust the position of the saddle structure in accordance with the desired position thereof appropriate to the rider. For example, this system permits one to vary the position and height of the inflatable portions of the air-cushion means to adjust the position at which the knees of the rider rest against the saddle structure during use of the assembly.

In order to impart the proper profile to the pillows and their compartments in planes transversely of the longitudinal axis of the assembly and to ensure that the cushions maintain the proper thickness in their expanded state at the various locations in the hollow of the saddle, the walls of the pillows are joined together by seams at spaced locations therealong. The pillows themselves can be composed of elastomeric material, such as rubber, or merely flexible materials, such as synthetic-resin foils, although I prefer to employ a thermoplastic substance for this purpose so that the seams between the compartments and within the compartments can be formed by heat sealing. Thus, the opposite faces of the pillows can be thermally welded together along strips disposed longitudinally with respect to the saddle structure, i.e. generally parallel to the aforementioned median plane, or parallel to boundaries of the cushion or saddle structure. Such thermally welded strips can extend along a major portion of the corresponding dimension of the air-cushion compartment although it is preferred not to have the seams within the compartments bridge opposite boundary seams and thus subdivide the compartments into further spaces limiting the access of air from one to another. In order to affix the pillows firmly to their envelopes, which can be composed of a flexible, shaped sheet material, and to prevent shifting of the pillows within such envelope, the pillows are formed with tabs stitched into the envelope, preferably at its peripheral seams.

Such tabs, of course, are provided at those locations at which there is the greatest tendency toward movement of the pillows within the envelope. As previously noted, the individual compartments of the pillows are provided with respective duct means and it has been found to be desirable to form such duct means with unidirectional valves of the type conventionally employed in pneumatic mattresses and the like to permit air to enter the pillows and prevent its escape therefrom without removal or opening of the valve member. If the air cushions are filled to an excessive extent under the circumstances, these valves can be opened to release part of the air and they are employed to supply air by mouth, pump or air canister, as desired.

These objects, features and advantages of the present invention will become more readily apparent from the following description, reference being made to the accompanying drawing in which:

FIG. 1 is a cross-sectional view taken along the longitudinal median plane of the saddle, according to this invention, with a pillow of the cushion means exposed along the near flank of the saddle; and FIG. 2 is a cross-sectional view taken along the line II—II of FIG. 1.

In the drawing there is shown a conventional English-type saddle structure 11 having a saddle bow 50 with a pommel 51 at the forward end of the seat 52 of the saddle structure 11 whose cantle 53 is formed at the right-hand side of the seat in the usual manner. In the hollow below the saddle structure 11 and inward of the fenders 54 flanking the seat 52, there is provided an air-cushion means having right-hand and left-hand symmetrically disposed air pillows extending on opposite sides of the median plate through the seat portion 52 within the saddle chamber 13 extending beneath the saddle structure 11 from the saddle bow to the cantle along the longitudinal axis of the saddle. Thus, this chamber constitutes a hollow disposed above and along the back of the horse and along the spinal column of the animal. Both halves of the saddle-cushion means 12 are composed of respective pillows or sleeves of envelopes 14 composed of an impregnated leather or fabric which can be stitched along the peripheral seams to enclose the individual cushions 15 on opposite sides of the median plane. The leather or other flexible envelope material can be impregnated with a synthetic-resin resistant to moisture, an oil or the like to reduce wear and prevent penetration by moisture or entrapment of moisture in such manner that the envelope cannot readily dry out. The pillows 15 are composed of rubber and extend on both sides of the saddle chamber 13 over the entire length of the saddle from the cantle to the forward portion of the saddle bow at 16 and the pommel. The air cushions 15 are subdivided into a rear-cushion compartment 17, a front-cushion compartment 18 and a lower-cushion compartment 19, the latter forming a chamber approximately disposed in the region of the saddle structure engaged by the knees of the rider. Chamber 19 is thus inflatable to adjust the position of rest of the rider's knees. The boundaries of the chambers 17, 18 and 19 and thus the seams separating them from one another to ensure that they will remain individual air cells, are shown at 20 and 21. These seams are vulcanized-closed in a conventional manner. To prevent the inflation of the individual air-cushion chambers 17, 18 and 19, respective tubes 22, 23 and 24, which are provided with respective unidirectional air valves or check valves 25, 26 and 27 of the type conventionally employed in air pillows and mattresses, are set into the walls of the chambers 17, 18 and 19 and are sealingly affixed thereto by vulcanization. The tubes 22, 23 and 24, as well as their respective valves 25, 26 and 27, are accessible from the exterior when the saddle is in place.

To impart to the air cushion the desired flattened configuration and prevent excessive inflation at some locations and deficient deflation at others, opposite walls of the compartments 17, 18 and 19 can be thermally welded together at heat seals or vulcanized welds. Thus, welds 28 and 29 are provided parallel to the longitudinal edges of the air cushions 15 in the rear chamber 17 and the forward chamber 18 along the saddle chamber 13. This ensures that the pillows in the region of the saddle chamber 13 remain relatively flat even after inflation so that the saddle will sit well or deep upon the back of the animal. The saddle chamber will have no greater height than is required to accommodate the spinal region of the horse with the necessary freedom of movement. It has further been found to be desirable that in the central regions of the saddle pockets the air cushions should also be relatively flat and for this purpose thermal welds 30 and 31 are provided parallel to the lower edges of air cushion 15 in the forward chamber 18 and the rib chamber 19. To fasten the cushion 15 with the surrounding envelope 14, which is in turn fastened to the underside of the saddle structure 11 via the loops 55, I provide on the periphery on the cushion 15 at a rearward location 32, a forward location 33 and lower locations 34 and 35 respective tabs which are stitched into the closure seams of the envelope 14. Such tabs prevent movement of the rear-cushion structure within the envelopes 14. It will be apparent that the saddle can easily be adjusted by introducing air to or removing air from the compartments 17, 18 and 19 of each pillow respectively and that the saddle assembly can thus easily be accommodated to various animals without the danger of applying undue pressure to the back of the animal. Moreover, the adjustment can be made to accommodate the seat of the rider and the cushions themselves ease the general strain upon the animal. It will be further understood that the saddle can be modified in many respects which will be apparent to those skilled in the art and is, therefore, considered within the spirit and scope of the appended claims.

I claim:

1. A riding saddle, comprising a saddle structure having a pommel, seat, cantle, and a pair of fenders extending downwardly from said seat on opposite sides of the saddle structure; and a pair of pneumatic cushions underlying said saddle structure symmetrically on opposite sides of a vertical median plane extending longitudinally through said saddle structure, each of said cushions extending the entire length of said saddle and being subdivided by two longitudinally spaced seams into three individually inflatable and separate flat air chambers, including a rear chamber below said cantle, a forward upper chamber below said pommel and a forward lower chamber below and forwardly of said forward upper chamber along the fenders of the saddle structure, the chambers of each cushion being formed unitarily with one another and being provided with respective air tubes for individually filling said chambers.

2. A riding saddle as defined in claim 1 wherein the rear and forward upper chambers of each cushion are respectively provided with longitudinally extending seams joining the walls of the respective cushion at locations within the respective chambers along lines generally parallel to the longitudinal axis of said structure along said seat for maintaining a flat configuration of the respective cushion in the region of the seat, said forward chambers of each cushion being provided inwardly thereof with respective seams extending generally downwardly and joining the walls of the respective cushion along lower edges thereof.

3. A riding saddle as defined in claim 2, further comprising a flexible envelope containing each of said cushions, said envelopes being composed of a fabric and being stitched around their peripheries, said cushions being provided with outwardly projecting tabs of limited perimetral extent sewn into the stitched peripheries of said envelopes.

4. A riding saddle as defined in claim 3 wherein each of said cushions is provided with a first tab at an upper portion of the respective cushion in the region of the respective rear chamber, a second tab at another portion of the respective forward upper chamber, a third tab at a lower region of the respective forward upper chamber and a fourth tab at a lower region of said forward lower chamber, all of said tabs of each cushion being stitched to the respective envelope.

5. A riding saddle as defined in claim 4 wherein each of said tubes is provided with a respective checkvalve permitting entry of air into the respective chamber but releasably blocking reverse flow therefrom.

References Cited
UNITED STATES PATENTS

| | | | |
|---|---|---|---|
| 532,419 | 1/1895 | Haines | 54—66 |
| 753,751 | 3/1904 | Stern | 54—44 |

FOREIGN PATENTS

| | | |
|---|---|---|
| 4,212 | 12/1896 | Great Britain. |

SAMUEL KOREN, *Primary Examiner.*

HUGH R. CHAMBLEE, *Examiner.*